Dec. 14, 1948.  E. W. S. NICHOLSON  2,456,306
CONVERSION OF HYDROCARBON OILS
WITH FINELY DIVIDED CATALYST
Filed Sept. 10, 1943
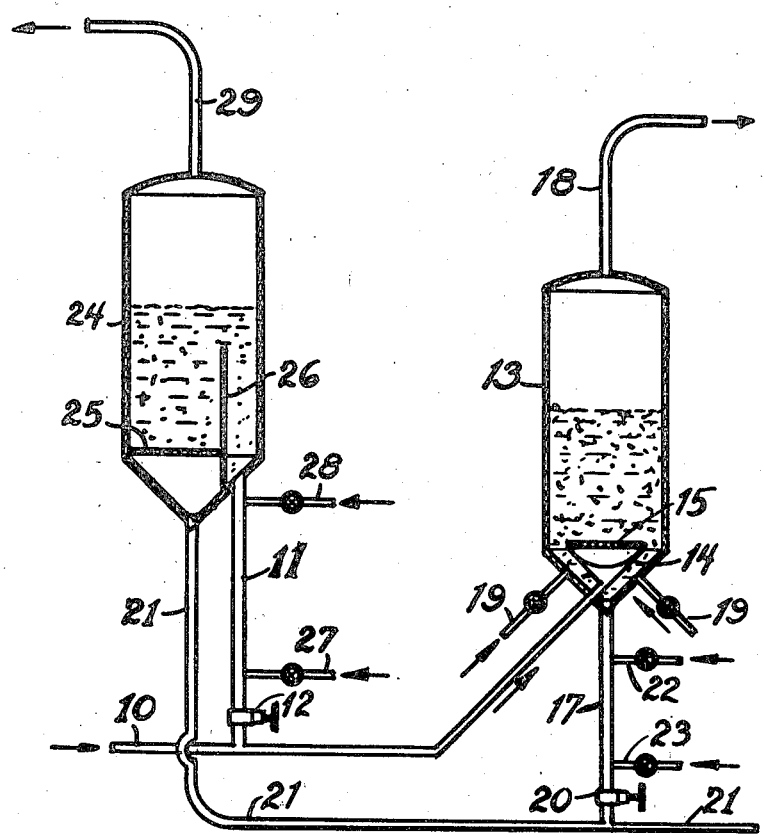
Edward W. S. Nicholson Inventor
By P. L. Young Attorney Patented Dec. 14, 1948

2,456,306

UNITED STATES PATENT OFFICE 2,456,306

CONVERSION OF HYDROCARBON OILS WITH FINELY DIVIDED CATALYST

Edward W. S. Nicholson, Baton Rouge, La., assignor to Standard Oil Development Company, a corporation of Delaware Application September 10, 1943, Serial No. 501,741

6 Claims. (Cl. 196—52)

This invention relates to catalytic conversion of hydrocarbon oils in the presence of finely divided catalytic material and is concerned more particularly with the method of reducing the amount of catalytic material entrained in the reaction products.

It has heretofore been proposed to accelerate or control the conversion of hydrocarbon oils by employing finely divided catalytic material dispersed in the oil vapors to be converted.

According to one procedure heretofore employed, a stream of finely divided catalytic material is introduced into the oil to be converted and the resulting mixture or dispersion then passes through an elongated vertical conversion chamber. The velocity of the oil vapors passing upwardly through the chamber is sharply reduced upon entering the chamber and controlled to effect segregation of the finely divided catalytic material from the oil vapors into a relatively dense layer maintained in a turbulent condition by the upward passage of the oil vapors therethrough.

Following the conversion treatment, the gaseous conversion products containing a small amount of entrained catalytic material are removed from the upper end of the chamber. A stream of catalyst is also continuously removed from the dense layer of the catalytic material and passed into a regeneration zone wherein combustible deposits formed on the catalyst during the conversion treatment are oxidized.

When operating in this manner, catalyst is preferably withdrawn at a rate to maintain the level of the catalytic layer a substantial distance below the top of the chamber in order to reduce the amount of material entrained in the reaction gases.

It has been found, contrary to expectations, that the presence of a small amount of extremely fine material tends to reduce the amount of material entrained in the gas stream.

The invention finds particular application in the cracking of hydrocarbon oils wherein a synthetic gel is employed as a catalyst. These gels may be prepared by impregnating a silica hydrogel with an aluminum salt solution and thereafter decomposing the salt into alumina. Following this, the catalyst may be dried to remove the water and thereafter activated at a temperature of 700° F. to 800° F. for several hours. In order to employ synthetic gels of this type in the cracking of oils, it is necessary to grind the gel into extremely fine powder. This grinding operation materially increases the cost of producing the catalyst. In accordance with the present invention, the amount of grinding necessary is materially reduced by incorporating with the finished powdered synthetic gel catalyst a minor percentage of activated clays, such as acid-treated bentonites of materially small particle size. The presence of this finely divided clay admixed with the coarser synthetic gel catalyst tends to reduce the amount of entrained solids, and particularly the amount of synthetic gel catalyst, carried out with the gas stream. The activated clay admixed with the synthetic gels employed for the cracking operation preferably has a particle size ranging from 1 to 20 microns and the amount of such material admixed with the synthetic gel would be of the order of from 5 to 30% of the gel. The natural clays are normally more soft and easier to grind than the synthetic gel type catalysts.

For a better understanding of the invention reference is now made to the accompanying drawing which is a diagrammatic illustration of an apparatus suitable for carrying the invention into effect.

Referring to the drawing, the reference character 10 designates a charge line through which the oil to be cracked is introduced into the system. This oil may be a clean condensate oil such as a gas oil or it may be a residual oil such as a topped or reduced crude. The oil introduced through line 10 is intermixed with a finely divided catalytic material charged into the oil line 10 through conduit 11 having a control valve 12 for regulating the amount of catalyst introduced into the oil. The catalyst employed in accordance with the invention consists primarily of a synthetic gel comprising silica combined with other metallic oxides, such as alumina, magnesia, zirconia, boron oxide, and the like.

In accordance with the present invention, this synthetic gel catalyst is intermixed with a small percentage ranging from 5 to 30% of natural products such as activated clays having an extremely small particle size, such as from 1 to 20 or 25 microns.

The oil prior to admixing with the catalyst may be preheated to the desired reaction temperature, or the catalyst discharged into the oil may be at an initial temperature sufficient to supply a substantial portion of the heat required for the cracking operation.

The amount of catalyst introduced into the oil stream will vary over a relatively wide range but may be of the order of from 2 to 20 or more parts of catalyst per part of oil by weight.

The resulting mixture of oil vapors and catalyst formed at the juncture of the catalyst column 11 and the feed line 10 is passed into the bottom portion of the cracking chamber 13. The mixture is preferably introduced through a distributing cone 14 having a perforated grid 15 for distributing the oil vapor-catalyst mixture over the cross-sectional area of the chamber. The distributing cone 14 is preferably spaced from the outer wall of the reaction chamber to form an annular space for the continuous withdrawal of the catalytic material, as later described.

The velocity of the oil vapors passing upwardly through the cracking chamber 13 is controlled to permit or cause the bulk of the catalyst to settle into a relatively dense layer in the bottom portion of the cracking chamber. This layer will be maintained in a violent turbulent condition by the upward passage of the oil vapors undergoing cracking. The cracking chamber may be maintained at a temperature of from 800° F. to 1000° F.

The catalyst is removed from the bottom portion of the reaction chamber 13 through a vertical column 17 at a rate controlled to maintain the level of catalytic material in the reaction chamber substantially below the top of the chamber so as to form a free space above the catalyst level. This free space should range between 5 and 20 feet, depending upon the size and density of the catalyst particles, the velocity of the gas, and other factors. The height of the cracking chamber should be sufficient to provide a depth of catalyst within the chamber sufficient to provide adequate contact time to obtain the desired cracking and at the same time provide adequate free space above the level, as previously mentioned.

The time of residence of the oil vapors within cracking chamber 13 may be of the order of 5 to 50 seconds or more, depending on the type of oil treated.

The cracked products after passing through the reaction chamber 13 are withdrawn overhead through line 18 and may be passed to dust recovery equipment and to a fractionating tower (not shown) for segregation of the cracked vapors into the desired components.

Catalytic material is continuously removed from the reaction chamber through the vertical column or conduit 17, as previously described. If desired, a stripping or purging gas may be introduced into the catalyst below the distributing cone 14 through line 19 to remove volatile hydrocarbon constituents admixed with the catalyst being removed.

The catalyst collected in the column 17 is continuously discharged through a control valve 20 into a stream of regeneration gas such as air introduced through line 21.

A small amount of an aerating or fluidizing gas is preferably introduced at spaced points along the column 17 through lines 22 and 23 to maintain the catalyst in a fluidized state during its passage through the column.

By maintaining the catalyst within the column 17 in a fluid state, a fluid pressure may be generated at the base of the column. To avoid by-passing of a portion of the air upwardly through the column 17 into the cracking chamber 13, the column 17 should be of a height sufficient to generate a fluid pressure at the base thereof greater than the pressure on the air stream introduced through line 21.

The mixture of air and catalyst formed in the line 21 is passed into the base of a regenerating chamber 24, preferably below a perforated grid 25 which serves to distribute the catalyst in the regeneration chamber. The velocity of the air stream passing upwardly through the regeneration chamber is preferably controlled to permit the catalyst to separate into a dense layer in the bottom portion of the regenerator, as previously described in connection with the cracking chamber 13.

The catalyst is subjected to regeneration within regeneration chamber 24 to oxidize combustible deposits which are formed on the catalyst during the cracking operation.

The regeneration chamber 24 may be provided with a vertical partition 26 terminating below the level of the catalyst layer therein to form a well for collecting and removing regenerated catalyst from the chamber. The bottom portion of the well communicates with vertical column or standpipe 11 for returning the catalyst to the oil stream.

A fluidizing gas is preferably introduced at one or more points along column 11 through lines 27 and 28 to maintain the catalyst in a fluid condition, as previously described in connection with the vertical column 17.

The regeneration gases after passing through the regeneration chamber 24 are removed overhead through line 29 and may be passed to additional separating equipment such as electrical precipitators, cyclone separators, bag filters, scrubbing chambers, or the like for the removal of the entrained catalyst therefrom.

The catalyst is continuously removed from the regeneration chamber at a rate sufficient to maintain the level of the dense layer of catalytic material in the regeneration chamber a substantial distance below the outlet in order to avoid excess entrainment of the powder in the gas being removed from the chamber.

As previously pointed out, it has been observed that the weight of entrained solids contained in the gas leaving the regenerator and the reactor is reduced by keeping a minor portion of extremely fine powder in the catalyst.

In accordance with the present invention the extremely fine material employed to reduce the entrainment of catalyst in the gas stream comprises natural products such as activated clay so that the amount of grinding of synthetic gels is materially reduced.

For example, it has been found that by employing from 5 to 30% of activated clay in an extremely finely divided form having a particle size ranging from 1 to 25 microns the amount of entrainment of solid material in the gas streams leaving the reaction and regenerating zones may be reduced to one-half of that which would be entrained in the absence of particles of this size.

Having described the preferred embodiment of the invention, it will be understood that it embraces such other variations and modifications as come within the scope of the accompanying claims.

I claim:

1. A process for the catalytic cracking of hydrocarbon oils which comprises passing the oil through a layer of cracking catalyst in powder form and contained within a cracking chamber, said powder comprising a mixture of relatively coarse synthetic cracking catalyst and relatively fine clay, continuously charging to said cracking chamber a major portion of a synthetic cracking catalyst in the form of particles of relatively large size and a minor portion of from 5 to 30 weight per cent based upon said synthetic cracking catalyst of a fine clay ranging from 1 to 25 microns in diameter, separately withdrawing a stream of said powder from the bottom portion of said cracking chamber independently of said oil vapors at a rate sufficient to maintain the level of said powder a substantial distance below the top of said cracking chamber, regulating the velocity of the oil vapors rising through said chamber to maintain said layer of powder in a turbulent state, keeping the oil vapors in contact with the layer of catalyst powder at cracking temperature for a period sufficient to obtain the desired conversion thereof, withdrawing vaporous cracked products from the upper portion of said cracking chamber and fractionating the cracked products to segregate a desired fraction therefrom.

2. In the process defined by claim 1, the further improvement which comprises regenerating the catalyst removed from said cracking chamber and thereafter returning the regenerated catalyst to said cracking chamber.

3. In a continuous process for effecting a catalytic conversion of hydrocarbons with finely divided catalyst which is repeatedly contacted with a gas or vapor, the improvement which comprises charging to the process a major portion of a synthetic catalyst in the form of a powder consisting of particles of relatively large size and also charging to the process a minor portion of a powder of a siliceous earth consisting essentially of particles of smaller size than the particles of said synthetic catalyst, said siliceous earth being of less catalytic activity than said synthetic catalyst and being introduced in such an amount that in the mixture so produced the relatively large particles of catalyst consist essentially of said synthetic catalyst and the particles of smaller size consist predominantly of said siliceous earth, whereby the catalyst particles lost from the system during operation through carry-over in the gas or vapor consist largely of the added finely divided particles of relatively less catalytically active siliceous earth.

4. In a continuous process for effecting a catalytic conversion of a hydrocarbon with a finely divided synthetic catalyst wherein the catalyst is repeatedly contacted with a gas or vapor, the improvement which comprises charging the synthetic catalyst to the process in the form of a powder consisting essentially of particles of at least 20 microns and also charging to the process a powder of a siliceous earth consisting essentially of particles less than 20 microns, said siliceous earth being of lesser activity than said synthetic catalyst and being introduced in such an amount that in the mixture so produced the particles greater than 20 microns consist essentially of said synthetic catalyst and the particles less than 20 microns consist predominantly of said siliceous earth.

5. In a continuous process for effecting a catalytic conversion of hydrocarbons in the presence of finely divided catalyst material by passage of a hydrocarbon in vaporous form upwardly through a relatively dense layer of catalyst in the lower portion of a conversion zone said catalyst being maintained in a turbulent condition by the upward passage of the hydrocarbon vapors therethrough with continuous removal of conversion products overhead from the conversion zone and continuous withdrawal of a stream of catalyst particles downwardly from said dense layer, the improvement which comprises continuously charging to the conversion zone a major portion of a synthetic gel catalyst in the form of particles of relatively large size and a minor portion of from 5 to 30 weight per cent based upon said synthetic gel catalyst of a powdered contact material having a particle size ranging from 1 to 25 microns and showing substantially less catalytic activity than said synthetic gel catalyst thereby reducing the amount of catalyst entrained and carried overhead by the conversion products.

6. The process as defined in claim 5 wherein the powdered contact material of 1 to 25 micron size is a clay.

EDWARD W. S. NICHOLSON.

REFERENCES CITED

The following references are of record in the file of this patent:

UNITED STATES PATENTS

| Number | Name | Date |
|---|---|---|
| 2,245,734 | Subkow | June 17, 1941 |
| 2,253,486 | Belchetz | Aug. 19, 1941 |
| 2,303,547 | Hancock | Dec. 1, 1942 |
| 2,326,705 | Thiele et al. | Aug. 10, 1943 |
| 2,327,175 | Conn | Aug. 17, 1943 |
| 2,338,606 | Voorhees | Jan. 4, 1944 |
| 2,341,193 | Scheineman | Feb. 8, 1944 |
| 2,361,978 | Swearingen | Nov. 7, 1944 |
| 2,385,446 | Jewell et al. | Sept. 25, 1945 |